(No Model.)
R. BRADLEY, Jr.
SPECTACLE TEMPLE.
No. 373,006. Patented Nov. 8, 1887.
Fig. 1.
Fig. 2.
Fig. 3.
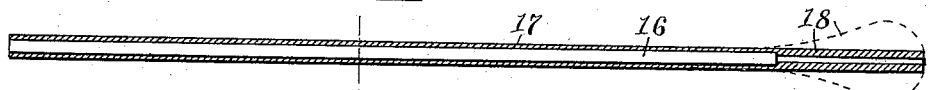
Fig. 4. Fig. 5.
 Fig. 6. 
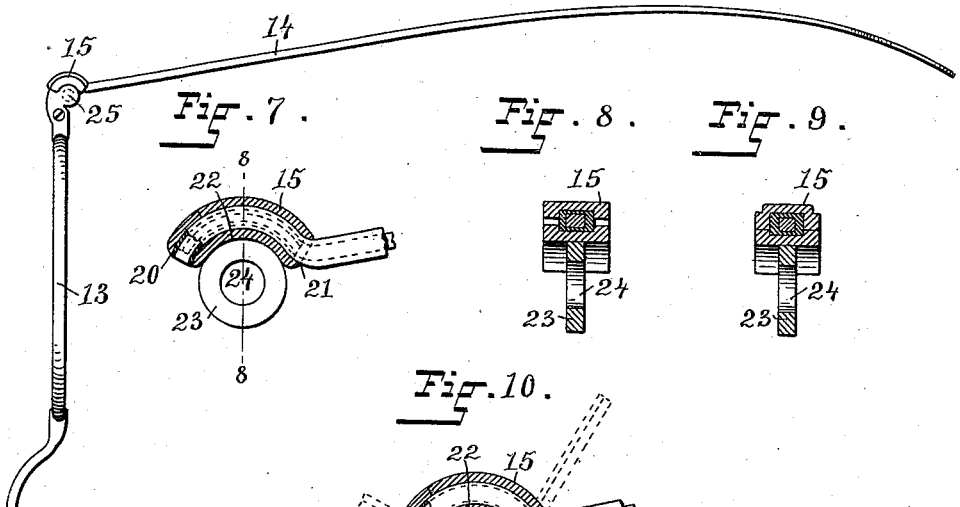
Fig. 11.
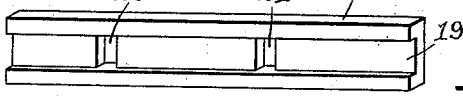
WITNESSES:
Chas. H. Luther Jr
M. F. Bligh.
INVENTOR:
Robert Bradley Jr
by Joseph A. Miller & Co.
Attys

UNITED STATES PATENT OFFICE.

ROBERT BRADLEY, JR., OF PROVIDENCE, RHODE ISLAND, ASSIGNOR TO ROBERT BRADLEY & SONS, OF SAME PLACE.

SPECTACLE-TEMPLE.

SPECIFICATION forming part of Letters Patent No. 373,006, dated November 8, 1887.

Application filed April 13, 1887. Serial No. 234,576. (No model.)

*To all whom it may concern:*

Be it known that I, ROBERT BRADLEY, Jr., of Providence, in the county of Providence and State of Rhode Island, have invented certain new and useful Improvements in Spectacles, &c., of which the following is a full, clear, and exact description, reference being had to the accompanying drawings, forming part of this specification.

This invention relates to spectacles which consist in general of a frame for holding the lenses and a temple or side bar hinged at the respective ends of the frame, the temples serving to clamp upon the sides of the head of the wearer with sufficient pressure to maintain the spectacles in wearing position. In order to perform their functions the temples have to have a slight resiliency; but as this amounts to little or nothing in a gold or silver temple the same are for this reason inefficient. On the other hand, the steel temples are objectionable for many reasons, and it therefore becomes desirable to combine the steel or base metal with a precious metal, as gold, and thereby secure the advantages resulting from the use of each metal.

One object of my invention is to construct temples of steel or resilient metals and precious metals combined, whereby a more efficient and durable article may be produced.

Another object of my invention is to secure the temple to the spectacle-frame in a manner whereby the temper of the steel in the temple may not be drawn.

Another object of my invention is to provide a neat and strong hinge for the temple and frame, and, further, to entirely, or, if desired, to partially, conceal the steel core of the temple by the external cover or sheathing of precious metal.

To the above purposes my invention consists in the certain combinations set forth at the end of this specification, and comprising the following mechanical features and methods, namely: a temple composed of a resilient base-metal core and a precious-metal sheathing; a sleeve of precious metal formed from a slotted and grooved blank and secured to a hinge-leaf and adapted to receive the temple; the method of covering the core of the temple with a metallic sheathing by incasing the core in a tubular sheathing and pressing the sheathing into close contact with the core by drawing, rolling, or otherwise; the method of securing a steel or base-metal temple to the spectacle-frame without drawing the temper of the temple, and also of covering the end of the same.

In order that my invention may be fully understood, I have illustrated in the accompanying drawings and will proceed to describe the best forms and methods thereof so far devised by me, with the understanding that the invention admits of various modifications.

Figure 1 represents a side view of a base-metal core, rectangular in cross-section, and which is partially covered by an incasing tubular sheathing of precious metal before being drawn out. Fig. 2 represents a longitudinal central sectional view of Fig. 1. Fig. 3 represents a longitudinal central sectional view of the core and sheathing, after the former has been drawn out or extended in length and made to adhere closely to the core of the temple, one end of the sheathing being prolonged beyond the end of the core for a purpose hereinafter explained. Figs. 4 and 5 represent enlarged cross-sectional views of Figs. 1 and 3, respectively. Fig. 6 represents a view of one of my improved temples hinged to a portion of a spectacle-frame by means of my novel sleeve-piece. Fig. 7 represents an enlarged sectional view of my novel sleeve-piece having the outer end open to expose the end of the temple-core, which is shown in part and is surrounded by a precious-metal sheathing and is inserted in the sleeve, to which is secured a hinge-leaf, the section being taken in a plane normal to the axis of the hinge-leaf. Fig. 8 represents a sectional view taken on line 8 8 in Fig. 7, and shows the sleeve-piece before it is finally swaged into finished condition. Fig. 9 represents a sectional view similar to Fig. 8, and shows the sleeve-piece after being swaged. Fig. 10 represents a similar sectional view to that shown in Fig. 7, and shows the sleeve closed at the outer end, so as to entirely conceal the core. The dotted lines represent the positions of the free ends of the strip or blank from which the sleeve is made and at one stage of the formation of the sleeve. Fig. 11 represents the strip or blank from which the sleeve-piece is formed.

In the said drawings like numbers of reference designate corresponding parts throughout.

Referring to the drawings, the number 13 designates a portion of an ordinary spectacle-frame for holding the lenses; and 14 represents my improved composite form of temple, which is in part secured to the frame 13 by means of the peculiar sleeve-piece 15.

The temple or side bar 14 is composed of a core, 16, made of a resilient base metal, preferably steel, which I incase and entirely conceal by the sheathing 17, as follows: I insert the steel core 16, which is rectangular in cross-section, within the tubular sheathing 17, which is made of precious metal, preferably gold, and loosely fits the core. I then press the sheathing or draw the same through dies, so as to cause it to be drawn out and forced into close contact with the core. This drawing out of the sheathing 17 will elongate the same, as shown at the right hand of Fig. 3, which elongation I flatten and swage up tightly, so as to form a solid flattened end, 18, designed to bear upon the side of the head in using the spectacles.

The cross-sectional views in Figs. 4 and 5 represent, respectively, the loosely-fitting sheathing and core before the former is pressed into snug adherence with the core, and after the same has been so drawn into form.

By virtue of constructing the temple 14 out of a steel or other base-metal core and a gold sheathing, I secure a very solidly-formed composite bar or temple which possesses all the advantages of both the solid steel bars and solid gold bars, with the disadvantages of neither, since the rusting of the steel is obviated. Likewise the defect of the non-resiliency of the solid gold temple is avoided.

In order to secure the temple to the spectacle-frame 13 in a neat and durable manner, and in order to prevent the bad result of drawing the temper from the steel temple, I have devised a novel sleeve-piece, 15, which is shown in blank form in Fig. 11. This sleeve is made from a flat strip, which is provided with a longitudinal central groove, 19, and with the respective transverse slots 20 and 21, which extend from the outside or back of the blank into the bottom of the slot 19. The blank of the sleeve is first bent into the position of the dotted lines, as shown in Fig. 10, with the central portion curved, as at 22. The end of the temple is then inserted in the sleeve through the slot 21, and is introduced into the groove 19 and is entered well within the sleeve, and then the free ends of the sleeve-blank are closed over onto the exposed side of the temple, which then lies within the same, as shown in Fig. 8. After this is effected the sleeve is swaged firmly, so as to assume the form shown in Fig. 9, and thus the strip-like blank is pressed into a solid sleeve.

In Fig. 7 the sleeve 15 is shown formed with the slot 20, through which the end of the steel temple-core 16 may be seen, and this facility for inspecting the steel core may be adopted, if desired. On the other hand, in order to conceal entirely the steel core 16 the slot 20 is to be omitted, as shown in Fig. 10.

Just before the temple is introduced into the partially-finished sleeve 15 the hinge-leaf 23 is soldered to the concave face 22 of the sleeve. In this way the heat necessary to accomplish the soldering is prevented from in anywise affecting the temper of the metal of the temple, which, as before stated, is secured in the sleeve after the hinge-leaf 23 is soldered.

The hinge-leaf 23 is formed with an eye, 24, which is adapted to receive the hinge-pin 25, Fig. 6, by means of which the temple is secured to the frame 13.

It will thus be readily seen that by my improved composite temple and the method of constructing the same, and also the novel sleeve-piece and the method of mounting the same in position, I am enabled to make a very superior spectacle-temple and means for securing the same to the spectacle-frame.

Having thus described my invention, I claim as new and desire to secure by Letters Patent—

1. A spectacle-temple consisting in the combination, as hereinbefore set forth, with a metallic core, as steel, of a sheathing of precious metal, as gold, formed over the core and prolonged beyond the end of the core at the free end of the temple, substantially as herein described.

2. The combination, as hereinbefore set forth, with the temple and the sleeve surrounding the temple, of the hinge-leaf soldered to the outside of the sleeve, substantially as described.

3. The herein-described method of securing a steel or steel-cored temple to a hinge-leaf without drawing the temper of the steel, the method consisting in first soldering the hinge-leaf to the hinge-sleeve, then inserting the temple in the incasing-sleeve and swaging the latter into shape, substantially as herein described.

4. The composite temple 14, consisting in the combination of the core 16 with the precious-metal sheathing 17, formed into close adherence therewith, and prolonged beyond at the end of the core, as at 18, substantially as hereinbefore set forth.

5. The combination, with a hinge-leaf, of the temple, and the slotted sleeve-piece 15, adapted to receive and incase the temple and to secure the temple in position, substantially as hereinbefore set forth.

6. The incasing sleeve-piece 15, composed of a grooved and slotted strip formed substantially as and for the purpose herein set forth.

7. As a new article of manufacture, a composite spectacle-temple composed of a base-metal core having a separate precious-metal sheathing concealing the same and disconnected therewith, substantially as and for the purpose herein described.

ROBERT BRADLEY, JR.

Witnesses:
J. A. MILLER, Jr.,
M. F. BLIGH.